US009224236B2

(12) United States Patent
Engel (10) Patent No.: US 9,224,236 B2
(45) Date of Patent: Dec. 29, 2015

(54) INTERACTIVE CHANGING OF THE DEPICTION OF AN OBJECT DISPLAYED USING VOLUME RENDERING (75) Inventor: Klaus Engel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 730 days.

(21) Appl. No.: 12/881,818

(22) Filed: Sep. 14, 2010

(65) Prior Publication Data
US 2011/0069066 A1 Mar. 24, 2011

(30) Foreign Application Priority Data
Sep. 21, 2009 (DE) .......................... 10 2009 042 326

(51) Int. Cl.
G06T 15/08 (2011.01)
G06T 19/00 (2011.01)

(52) U.S. Cl.
CPC ................. *G06T 15/08* (2013.01); *G06T 19/00* (2013.01); *G06T 2210/41* (2013.01)

(58) Field of Classification Search
None
See application file for complete search history.

(56) References Cited

U.S. PATENT DOCUMENTS

| 2004/0257375 A1* | 12/2004 | Cowperthwaite | 345/582 |
| 2005/0062738 A1* | 3/2005 | Handley et al. | 345/419 |
| 2005/0093874 A1* | 5/2005 | Levene et al. | 345/582 |
| 2005/0231530 A1* | 10/2005 | Liang et al. | 345/619 |
| 2006/0056272 A1* | 3/2006 | Hill | 367/73 |
| 2007/0018993 A1* | 1/2007 | Levene et al. | 345/582 |
| 2007/0195088 A1* | 8/2007 | Engel et al. | 345/424 |
| 2008/0150942 A1* | 6/2008 | Mitchell et al. | 345/424 |
| 2009/0002366 A1* | 1/2009 | Kanitsar et al. | 345/419 |

OTHER PUBLICATIONS

Owada, Shigeru, Frank Nielsen, and Takeo Igarashi. "Volume catcher." Proceedings of the 2005 symposium on Interactive 3D graphics and games. ACM, 2005.*
Chen, Hung-Li Jason, et al. "Sketch-based volumetric seeded region growing." Proceedings of the Third Eurographics conference on Sketch-Based Interfaces and Modeling. Eurographics Association, 2006.*
Kruger, Jens, and Rüdiger Westermann. "Acceleration techniques for GPU-based volume rendering." Proceedings of the 14th IEEE Visualization 2003 (VIS'03). IEEE Computer Society, 2003.*
Correa, Carlos D., Deborah Silver, and Min Chen. "Volume deformation via scattered data interpolation." Proceedings of the Sixth Eurographics/Ieee VGTC conference on Volume Graphics. Eurographics Association, 2007.*

(Continued)

Primary Examiner — Daniel Hajnik
(74) Attorney, Agent, or Firm — Lempia Summerfield Katz LLC (57) ABSTRACT A depiction of a three-dimensional object that is displayed using volume rendering is influenced. A representation of the object, in which values of a variable characterizing the object are given at spatial points of the object and in which color values are allocated to the variable during the course of rendering, is provided. A set of points defined in the space of representation of the object is input, and a distance from spatial points incorporated by the representation to the set of points is calculated. Color values allocated to spatial points are modified, or color values are determined according to the calculated distance. A depiction of the object by volume rendering is calculated using the representation of the object, the representation incorporating the modified or determined color values.

19 Claims, 8 Drawing Sheets

(56) References Cited

OTHER PUBLICATIONS

Mizuno et al. "Virtual Sculpting and Virtual Woodblock Printing as a Tool for Enjoying Creation of 3D Shapes", Forma, 15, 29-39, 2000.*

German Office Action dated Jan. 10, 2011 for corresponding German Patent Application No. DE 10 2009 042 326.5-53 with English translation.

H. Chen et al., "GPU-based point radiation for interactive volume sculpting and segmentation," Visual Computer, International Journal of Computer Graphics, vol. 24, No. 7-9 (2008): pp. 689-698.

J. Zhou et al., "Distance Based Enhancement for Focal Region Based Volume Rendering," Institute for Simulation and Graphics (2004): pp. 199-203.

P. Rheingans et al., "Volume Illustration: Nonphotorealistic Rendering of Volume Models," IEEE Transactions on Visualization and Computer Graphics, vol. 7, No. 3 (2001): pp. 253-264.

R. Huff et al., "Erasing, Digging and Clipping in Volumetric Datasets with One or Two Hands," Proc. of the 2006 ACM International Conf. on Virtual Reality Continuum and its Applications (2006): pp. 271-278.

R. Huff et al., "Volume sculpting based on geometric tools," Journal of the Brazilian Computer Society, vol. 15(2) (2009): pp. 3-18.

German Office Action dated Jan. 18, 2010 for corresponding German Patent Application No. DE 2009 042 326.5 with English translation.

Bürger, Kai et al., "Direct Volume Editing," IEEE Transactions on Visualization and Computer Graphics, vol. 14, No. 6, Nov./Dec. 2008, pp. 1388-1395.

Tiede, Ulf, "Realistische 3D-Visualisierung multiattributierter und multiparametrischer Volumendaten," Dissertation, Univ. Hamburg, 1999, pp. i-iv and 1-119.

Pflesser, B. et al., "Specification, Modelling and Visualization of Arbitrarily Shaped Cut Surfaces in the Volume Model," Institute of Mathematics and Computer Science in Medicine, Hamburg, Germany, 1998, 11 pages.

Chinese Office Action cited in CN2010102892202, mailed Jan. 23, 2014.

German Office Action cited in DE102009042326.5, mailed Feb. 19, 2014.

Mask (Computing), Aug. 17, 2009, pp. 1-5, Wikipedia.com.

Chinese Office Action dated Aug. 5, 2014 for corresponding Chinese Patent Application No. 201010289220.2 with English translation.

* cited by examiner

INTERACTIVE CHANGING OF THE DEPICTION OF AN OBJECT DISPLAYED USING VOLUME RENDERING

This application claims the benefit of DE 10 2009 042 326.5, filed Sep. 21, 2009.

BACKGROUND

The present embodiments relate to a method and to a device for influencing a depiction of a three-dimensional object.

The present embodiments lie within the field of volume rendering, the depiction or visualization of three-dimensional bodies or objects. The modeling, reconstruction or visualization of three-dimensional objects has a wide field of application in the area of medicine (e.g., CT, PET, MR, ultrasound), physics (e.g., electron structure of large molecules) and geophysics (e.g., composition and position of the earth's layers). The object to be investigated may be irradiated (e.g., using electromagnetic waves or sound waves) in order to investigate the composition of the object. The scattered radiation is detected, and properties of the body are determined from the detected values. The result conventionally includes a physical variable (e.g., proportion of tissue components, elasticity, speed), the value of which is determined for the body. A virtual grid may be used in this case, the value of the variable being determined at the grid points thereof. The grid points or the values of the variable at these locations may be voxels. The voxels are often in the form of gray scale values.

A three-dimensional depiction of an investigated object or body is produced from the voxels using volume rendering on a two-dimensional display area (e.g., a screen). Pixels, of which the image of the two-dimensional image display is composed, are produced from the voxels (e.g., with the intermediate acts of object points being obtained from the voxels by way of interpolation). Alpha compositing may be carried out in order to visualize three dimensions on a two-dimensional display. With alpha compositing, colors and transparency values (e.g., values for the non-transparency or opacity (the covering power of various layers of a body)) are allocated to voxels or volume points formed from voxels. More specifically, three colors in the form of a three-tuple, which codes the fractions of the colors red, green and blue (e.g., the RGB value), and an alpha value, which parameterizes the non-transparency, are allocated to an object point. Together the three-tuple and the alpha value form a color value RGBA that is combined or mixed with the color values of other object points to form a color value for the pixel (e.g., conventionally using alpha blending for the visualization of partially transparent objects).

An illumination model may be used to allocate a suitable color value. The illumination model takes account of light effects (e.g., reflections of light on the outer surface or surfaces of inner layers of the object being investigated) in the case of modeled or simulated irradiation of the object for the purpose of visualization.

The literature contains a range of illumination models that are used. The Phong or Blinn-Phong model, for example, may be used.

A frequently used method for volume rendering is ray casting (i.e., the simulation of incident light radiation to depict or visualize the body).

With ray casting, imaginary rays that emanate from the eye of an imaginary observer, are sent through the body or object being investigated. Along the rays, RGBA values are determined from the voxels for scanning spots and are combined using alpha compositing or alpha blending to form pixels for a two-dimensional image. Illumination effects are conventionally taken into account using the illumination models discussed above within the framework of a method called "shading."

The depiction of the object may be appropriately adjusted in order to better be able to study properties of an object depicted using volume rendering. The depiction of the object displayed on a screen may be changed or influenced, for example, by color effect, or removing or enlarging parts of the object (e.g., volume editing and segmentation). Volume editing may be interventions such as clipping, cropping and punching. Segmentation allows object structures, such as anatomical structures of a depicted body part, to be classified. During the course of segmentation, object components, for example, are colored or removed. Direct volume editing may be the interactive editing or influencing of object depiction using virtual tools such as brushes, chisels, drills or knives. For example, the user may interactively change the image of the object displayed on a screen by color effect or cutting away object parts using a mouse or another haptic input device or input device functioning in some other way.

When the depicted object is processed in such a way, it is often not enough to change the calculated pixels of the object image. The pixels are re-calculated, instead. In other words, with many manipulations of this kind (e.g., color effects, clippings), volume rendering is carried out again with every change. The manipulation is then carried out on the volume data used for volume rendering. A method for this has been proposed by Bürger, K. et al., "Direct Volume Editing," *IEEE Transactions on Visualization and Computer Graphics*, Vol. 14, No. 6 (2008): pp. 1388-95. This method allows the depiction to be manipulated by direct editing of a replicated volume.

There is a need for flexible, straightforward methods for manipulating the depiction of objects using volume rendering, where, primarily, memory, computing and bandwidth requirements are reduced in comparison with known methods.

SUMMARY AND DESCRIPTION

The present embodiments may obviate one or more of the drawbacks or limitations in the related art. For example, a flexible adjustment or change in the depiction of an object using volume rendering may be provided.

According to the present embodiments, a depiction (which conventionally includes pixels and may be displayed on a screen) of a three-dimensional object that may be displayed using volume rendering (e.g., ray casting) is influenced. This influencing includes, for example, an adjustment or change by color effect or removing parts of the object.

A representation of the object is used in which values of a variable characterizing the object (e.g., a physical variable such as the density) are given at spatial points of the object. The variable may, for example, be in the form of gray scale values that have been obtained using a measurement of an imaging method (e.g., nuclear spin, CT, ultrasound, PET). The spatial points may, for example, correspond with scanning spots used during the course of volume rendering (e.g., in the case of ray casting, scanning spots defined along a simulated ray). Color values may be allocated to the spatial points. The term 'color value' may include the different forms of color depiction. The term 'color value' may also include the depiction of color values in the form of the four RGBA values and therefore, opacity information as well.

Inputting of a set of points defined in the space of representation of the object is provided for influencing the depiction of the object. In one embodiment, the set of points is defined by parameters and may be input or determined by the parameters. For example, the parameters are given by points in the set of points. Furthermore, a geometry or a parameterized description of the set of points may be determined, so individual input points define the set of points. In one embodiment, the set of points is given by line segments, where end points of the line segments are input. In other words, the parameters or points define at least one line segment. Single points and a segment or a plurality of segments that may be connected may also be input. The input points may be located on the surface of the object. This may be a reasonable determination because various manipulations (e.g., color effect, cutting) start at the surface of the object. For example, movements made on a screen using an input device are captured and allocated points on the surface of the object (picking) (e.g., capturing the end points of a stroke and allocating a corresponding line segment).

The influenced or changed region of the object is determined via the set of points. For this purpose, a distance from spatial points incorporated by the representation to the set of points is determined and color values allocated to spatial points are modified or color values are determined according to the calculated distance. The distance may be the minimal distance (e.g., the distance to the next point in the set of points). The calculated distance is a criterion for subsequent action. For example, a threshold value is specified for the distance to the set of points and the color value of a spatial point is modified or determined if the calculated distance is less than the threshold value. In one embodiment, the threshold value is a parameter that may be input. The width, for example, of the changed region of the object may be controlled thereby.

The threshold value specified for the distance may be zero. For example, the user may ring a region on the screen in an input option, and the set of points is given by the surface region of the object that corresponds to the ringed region of the image. A corresponding region may also be defined in a parameterized form (e.g., by determining a center and a radius). In this constellation, the threshold value parallel to the region may also be zero, and only a depth of influencing may be determined.

The distance calculation may be limited to spatial points that may be affected by the influencing. For example, the spatial points may be given by scanning points of rays used in a ray casting. It may be determined which rays may be affected at all (e.g., by determining the minimal distance of the ray as a whole to the set of points), and a distance calculation for the scanning points is only made for affected rays. A subset of rays for which the ray casting is to be re-calculated is therefore determined. The result may be retained for the other rays.

Influencing takes place by changing or fixing the color value. This may affect individual components of the RGBA value (e.g., a color, transparency or both) or also take place by specifying or fixing a transfer function.

A depiction of the object using volume rendering (e.g., ray casting) is calculated by representation of the object, the representation incorporating the modified color values. A rendering that takes account of the parameters already input, may be carried out at the same time that parameters are input. The user is quickly provided with feedback on the most recent change (interactivity).

The present embodiments have the advantage that straightforward changes are made to the depiction. No replicated volume, in which changes take place, is used. The parameter-oriented input of changes is advantageous. Inputs may therefore be easily modified or reversed. This depiction is not voxel-oriented, so a scale (sub-voxels) that is more graduated with respect to voxel distances may also be used.

DETAILED DESCRIPTION OF THE DRAWINGS

Figure 1:
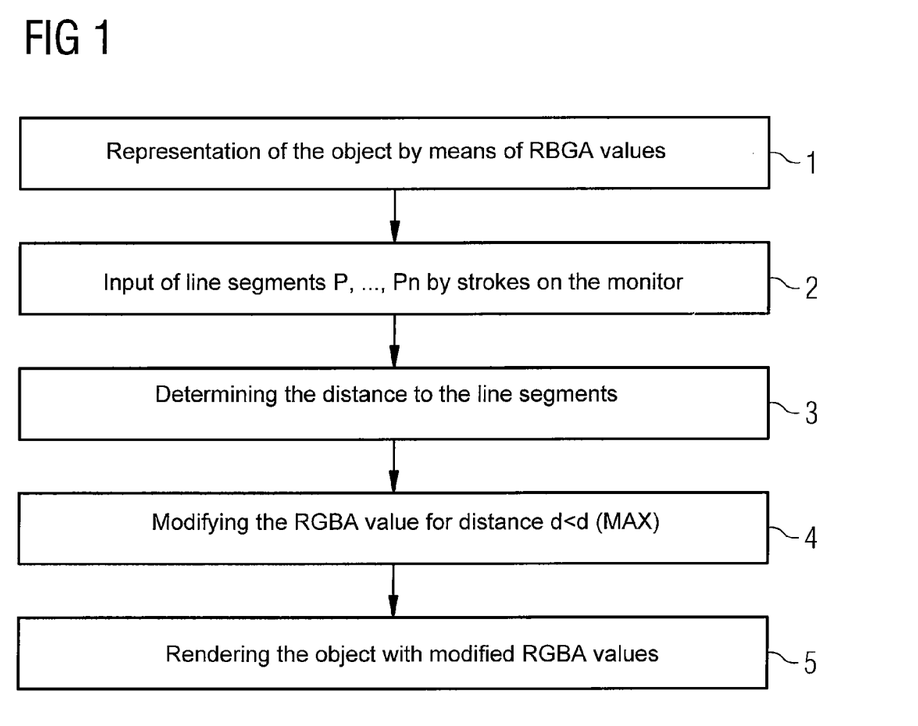
FIG. 1 shows a flowchart of one embodiment of a method for influencing a depiction of a three-dimensional object.

FIG. 1 shows a flowchart of one embodiment of a method for influencing a depiction of a three-dimensional object that is displayed using volume rendering. The starting point is the representation of the object using RGBA values (act 1 from FIG. 1). The RGBA values are determined using a conventional method (e.g., segmenting or classification and shading of gray scale values obtained for the object using imaging methods). For example, the RGBA values are given at scanning points of rays produced within the framework of a ray casting.

It will hereinafter be assumed that from this representation, a two-dimensional depiction has been produced (e.g., using ray casting). The two-dimensional depiction includes, for example, pixel values that may be used to display an image of the object on a screen or monitor.

Figure 2:
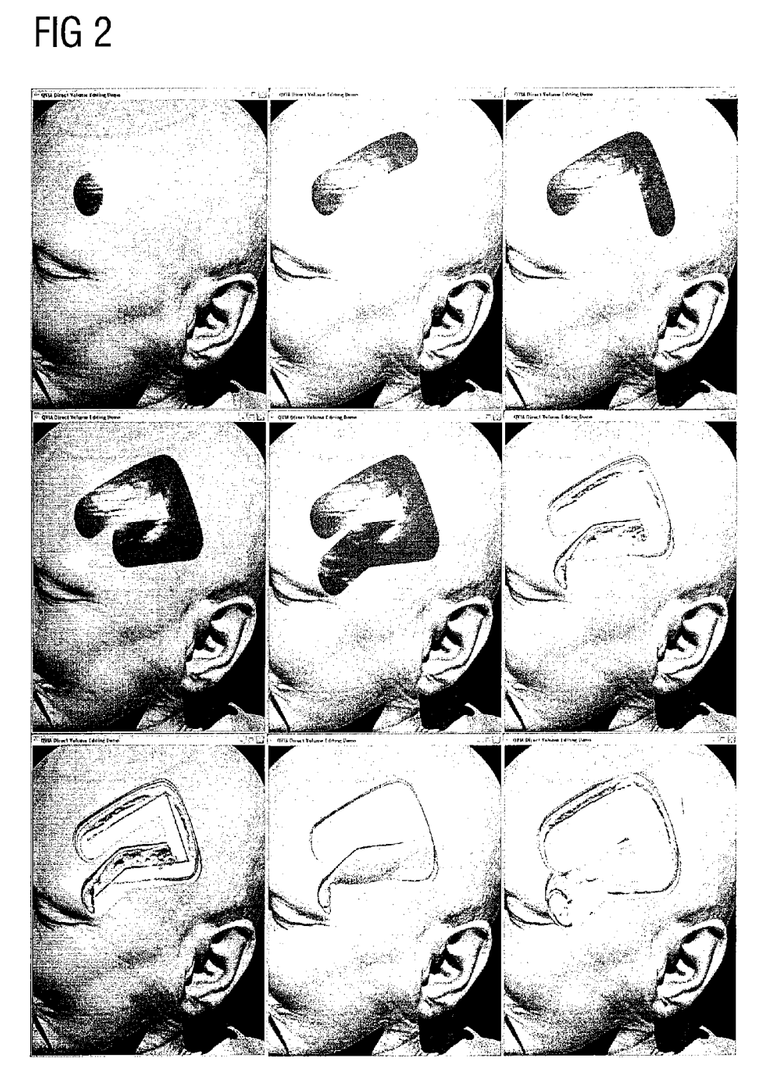
FIG. 2 shows changes to an object depiction using one embodiment of a method for influencing a depiction of a three-dimensional object.

FIG. 2 shows an example of a detail of the image of the object displayed on the monitor. Nine partial images that illustrate the procedure may be seen in FIG. 2.

The first five partial images (top row and left and middle images of the center row) show the modification of regions of the object using stroke movements or brush strokes. The stroke movements define line segments. This act (act 2 from FIG. 1) will be described in more detail below with reference to FIGS. 3 and 4.

As an input, a user or operator depicts a stroke on the illustrated image using an input device (e.g., a computer mouse). The stroke is registered (i.e., the position of the input device is detected). The start and end points of the stroke are allocated to the corresponding points on the surface of the object shown on the monitor. In other words, a stroke defines two points, P1 and P2, located on the surface of the object in the space of the representation. The middle partial image in the top row of FIG. 2 shows a rendering modified using a stroke. As long as an input mode (e.g., corresponding to pressing a mouse key) is maintained, a plurality of strokes may be executed one after the other in order to modify corresponding regions of the object. This is shown in partial images 3 to 5 of FIG. 2. There, a total of four strokes are executed so as to adjoin each other in order to color a region of the object. These four strokes correspond with points P1, P2, P3, P4 and P5 on the surface of the object, with two successive points defining a line segment.

In one embodiment, input information is quickly converted, by rendering into a correspondingly changed depiction of the object. The first five partial images of FIG. 2 relate to color effect of the regions determined by the input. Only point P1, the surroundings of which have been colored, is captured in the first partial image. In the second partial image, the line segment defined by P1 and P2 is captured and has been colored accordingly. The other line segments have been added in partial images 3 to 5. The concurrent adjustment of the image depiction on the monitor (by appropriate rendering of the object) has the advantage that the user is provided with a visual response during inputting and may use this for subsequent inputs.

Figure 3:
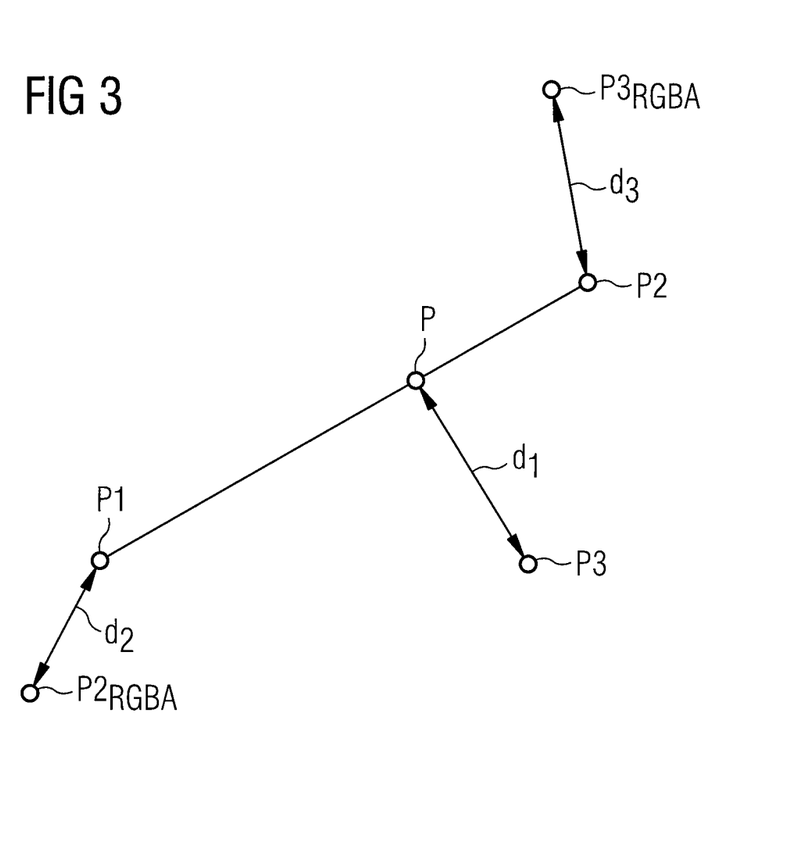
FIG. 3 shows an illustration of a distance calculation.
Figure 4:
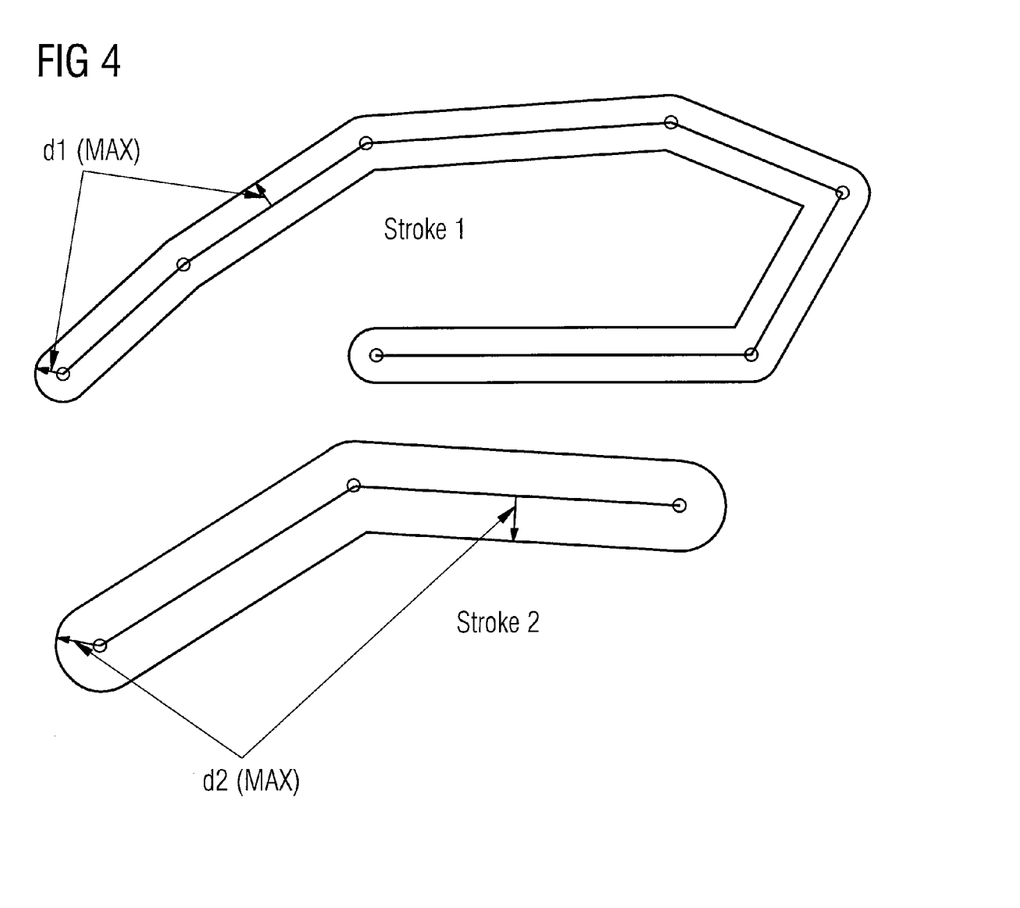
FIG. 4 shows an illustration of two produced strokes.

The change in depiction takes place by modification of RGBA values. A distance criterion is used to determine the RGBA values to be modified. Either an individual point, a line segment (e.g., with boundary points P1 and P2) or a plurality of line segments are defined by the input according to FIG. 2. The minimal distance to the corresponding set of points (point, segment or plurality of segments) is calculated (act 3 from FIG. 1) for points at which RGBA values are given according to the representation. In FIG. 3, this is shown for the line segment defined by P1 and P2 (point P, where P=P1+u*(P2-P1), u from [0.1]). For the point $P1_{RGBA}$, the minimal distance $d_1$ is the distance to point P on the segment. Point P, with the minimal distance, may be determined from the condition that a straight line leading through P and $P1_{RGBA}$ is perpendicular to the line segment defined by P1 and P2. Using the scalar product of vectors, this condition may be expressed as $(P1_{RGBA}-P)*(P2-P1)=0$. The statement P=P1+u*(P2-P1) used in this relationship and solution according to u then gives $u_{min}=(P1_{RGBA}-P1)*(P2-P1)/(P2-P1)**2$. The distance $d_1$ is then given by the distance of the points $P1_{RGBA}$ and P, where P is determined by $u_{min}$ (P=P1+$u_{min}$*(P2-P1)). For the points $P2_{RGBA}$ and $P3_{RGBA}$, the minimal distances $d_2$ and $d_3$ are the distances to the end points of the segment P1 or P2. For a plurality of segments, the minimal distance is determined by the minimum of the minimal distances to the individual segments. The result is the change in the depiction of the object in the region of the segments. FIG. 4 shows this for two instances. The top of FIG. 4 shows color effect of a region produced from six line segments lines, and the bottom shows color effect consisting of two line segments. Different maximal distances (d1(MAX) and d2(MAX)) are used here, which leads to colored regions of different widths. The width may be adjusted in accordance with existing requirements. The depth of the region may also be varied independently of the width. For example, the distance criterion may define the rays of a ray casting for which an RGBA value adjustment takes place. The length of the ray (measured from the surface) for which the adjustment is made may be determined according to a different criterion. This may be a distance criterion. However, an adjustment may be made until a change in tissue takes place (e.g., RGBA values may be adjusted along the ray for a class of tissue). This is helpful when removing a layer of tissue at input locations.

The criterion for changing or modifying the RGBA value at a point $P_{RGBA}$ is that the minimal distance is less than a maximal distance d(MAX).

FIG. 4 shows various color effects. The color effects refer to additional parameters with which the depiction is adjusted. The color effects relate to the modification that the RGBA values undergo (act 4 in FIG. 1). A region is colored, rendered non-transparent or removed depending on the change in the RGBA value. With color effect, an RGB value may, for example, be specified with which the respective RGBA value is modified (e.g., by addition, subtraction, multiplication or substitution). Three examples of parameters, on the basis of which a rendering may be carried out for a depiction changed in accordance with the input, are indicated below.

| Stroke | Brush RGBA | Brush radius | Brush points |
| --- | --- | --- | --- |
| 1 | (1., 0., 0., 1.) | 0.05 | (P1, P2, P3, P4, P5) |
| 2 | (0., 1., 0., 1.) | 0.2 | (P1, P2, P3) |
| 3 | (0., 0., 0., 0) | 0.15 | (P1, P2, P3, P4, P5, P6, P7, P8, P9) |

The brush RGBA parameter is multiplied by the RGBA values given at the scanning points that are to be changed. The last value of the parameter brush RGBA is the alpha value (e.g., the non-transparency). The alpha value is equal to 1 for the first two inputs above. In other words, a color effect according to the colors specified by the RGB values is provided (e.g., red or green). By contrast, the last entry relates to a removal (cutting), as the alpha value is equal to 0. This leads to a non-transparency of 0 (i.e., transparency of the affected scanning points). In one embodiment, a specific transfer function may be specified for the region.

The brush radius parameter determines the width (optionally, also the depth) of the changed region. The last parameter, stroke points, defines line segments (through the end points in each case) and therefore, together with the brush radius parameter, the manipulated region.

Inputs in the form of parameters allow inputs to be easily reversed or changed by changing the parameters. For example, the replacement (P1,P2,P3,P4,P5)→(P1,P2,P3,P4), in the case of the brush points parameter, reverses the last part of the input (e.g., the middle image 5 is replaced by image 4 in FIG. 2), and the replacement (P1,P2,P3,P4,P5)→(P1,P2, P3,P4,P5') changes this input.

The type of manipulation may also be changed. For example, a region is first colored and then removed. This is done by appropriately changing the brush RGBA parameter (alpha value=0) and in FIG. 2, has been carried out in the transition from partial image 5 to partial image 6. Partial image 7 of FIG. 2 shows the associated line segments. Further parameters or settings in addition to the parameters in the above table may determine the depiction of the object. For example, in partial image 8 of FIG. 2, the marked region has been removed only up to the cranial bone (e.g., to the next region of tissue). In partial image 9, the brush radius parameter has been changed (enlarged) to expand the affected region.

With each of these manipulations, the object is rendered with changed RGBA values (act 5 from FIG. 1). In one embodiment, the object is rendered using ray casting. Only rays that are influenced by the manipulation of the object depiction are re-calculated. Such rays are therefore identified in the course of a development. This may take place by calculation of the minimal distance from the ray to the set of points (or the line segments). If the minimal distance is greater than the brush radius parameter, the ray is not affected. A different approach is to first define the entire region that is affected before rendering, and to determine the rays that intersect the region.

One embodiment relates to the depiction of the surface when removing (cutting) a region of an object. Corresponding shading is used for the depiction of surfaces. In common models, the shading depends on the local gradients. In a removal from a region using the illustrated method, the local gradients do not correlate with the fact that a different surface of the object should be depicted in the affected region as a result of the removal. This is shown in the top-left partial image in FIG. 5. There, object regions have been removed using two stroke operations. The respective surfaces cannot easily be seen.

Figure 5:
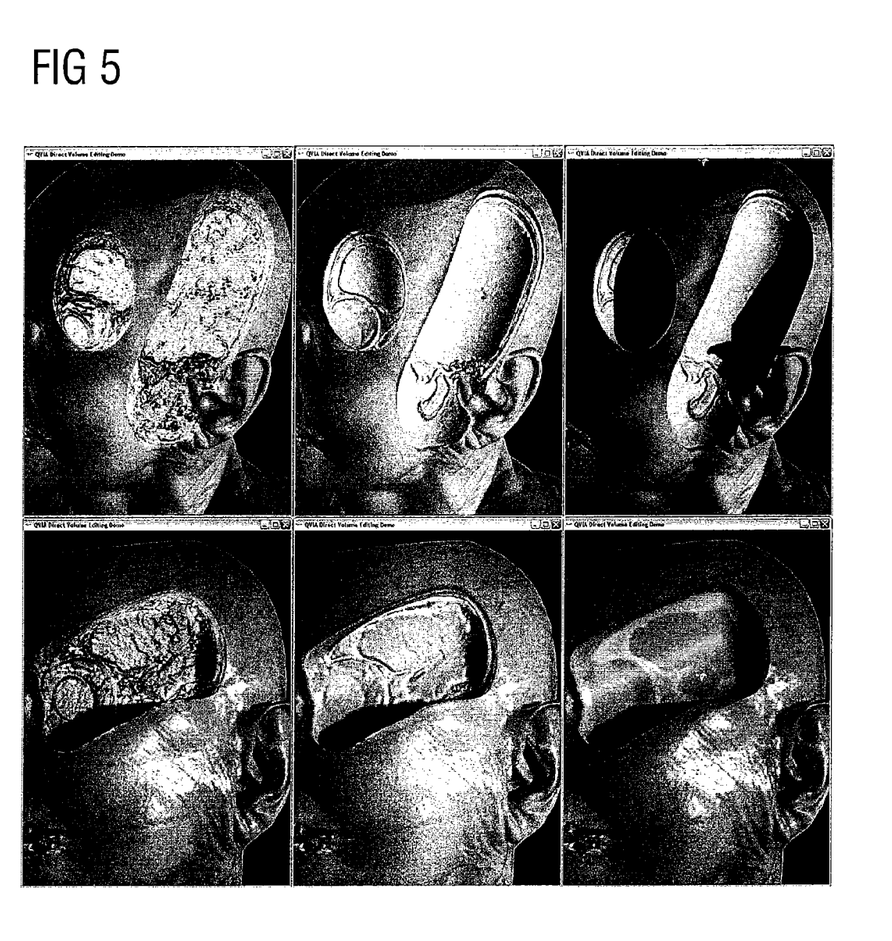
FIG. 5 shows an illustration of the effect of boundary gradient impregnation.

To better depict the surfaces in the case of cutting, a procedure called boundary gradient impregnation may be used. The local gradients are linked to surface gradients for a layer below the cutting region. The surface gradients, for example, are weighted and added to the local gradients. The top-center partial image of FIG. 5 shows the effect of such a procedure; the surface may be easily seen. In the top-right partial image, shadows have been calculated for the surfaces, resulting in an even more three-dimensional depiction. The bottom three partial images show the effect of the weight that accompanies the surface gradient. The weight increases from left to right in the bottom three partial images.

The method of the present embodiments has the advantage that the surface gradient may be calculated relatively easily on account of the parameterized depiction. If the removed regions are determined by a radius around line segments, the surface gradient may be obtained for a point on the surface by determining the minimal distance to the line segments. The difference in the point on the surface and the point of the line segments with the minimal distance is then parallel to surface gradients. This procedure may be carried out during the course of determining the region to be removed for scanning points (cf. FIG. 3).

Figure 6:
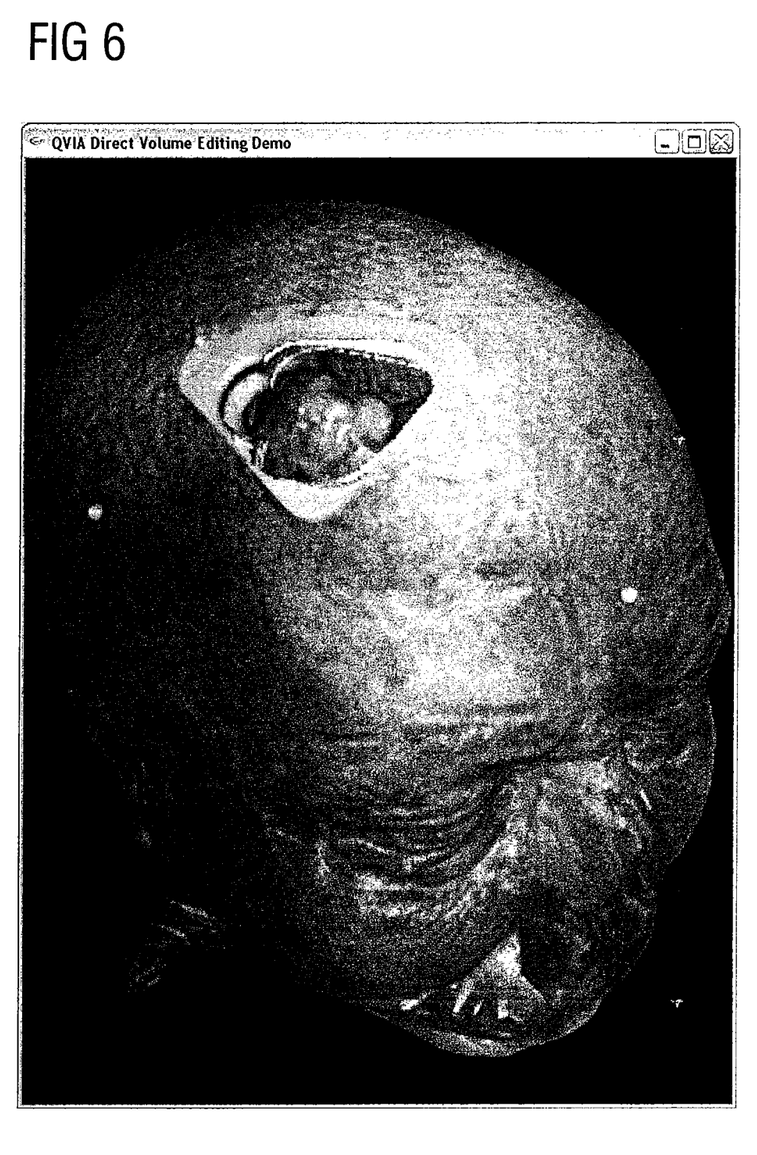
FIG. 6 shows use of one embodiment of a method for influencing a depiction of a three-dimensional object for a compiled data record.

The method may also be applied to combined data records (e.g., data obtained and combined using different medical modalities). FIG. 6 shows the combination of an MR data record, with which skin and the region inside the skull are depicted, and a CT data record with which bones are depicted. With a combined data record, operations may be carried out consecutively, in each case, for one data record (e.g., for the case in FIG. 6, first a cutting operation for the skin for the MR data record and then a cutting operation to remove bone for the CT data record). An additional parameter, which identifies the data record for which an operation is being carried out, may be introduced for this purpose.

Figure 7:
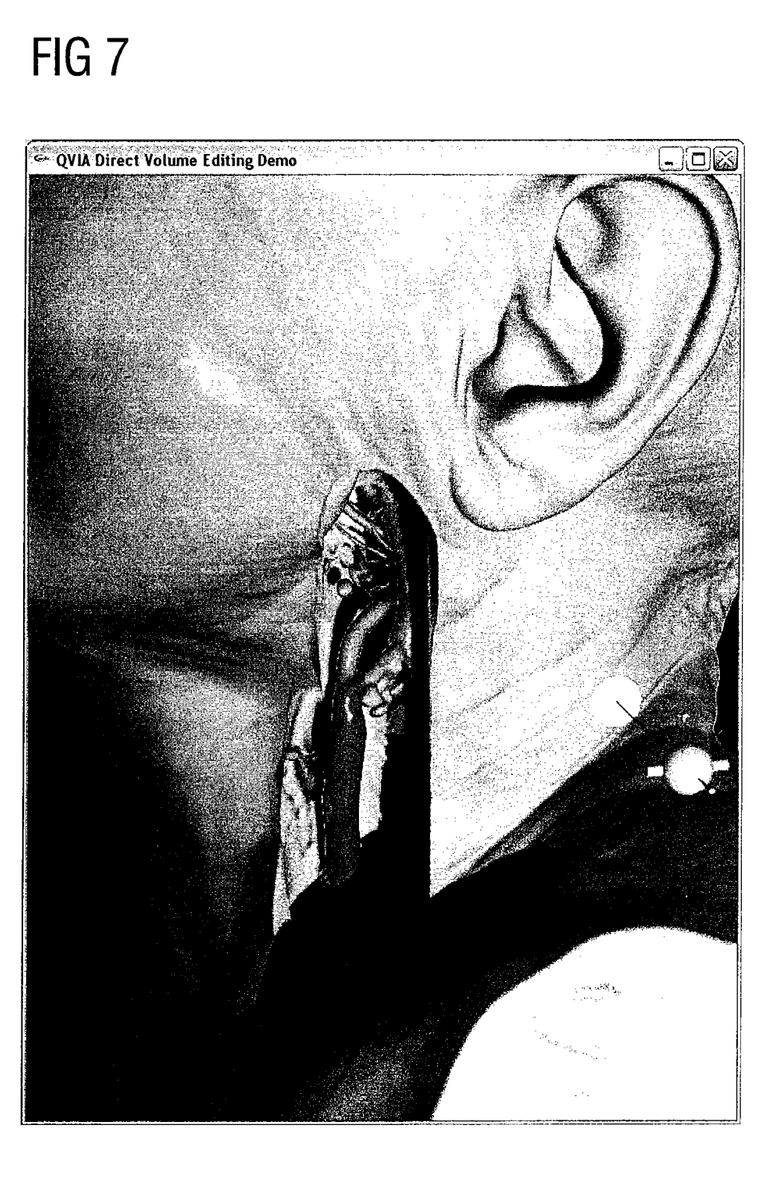
FIG. 7 shows use of one embodiment of a method for influencing a depiction of a three-dimensional object for segmenting.

FIG. 7 shows that the methods of the present embodiments are also suitable for interactive segmenting of the object. In interactive segmenting, cutting is linked with a threshold value method to eliminate a layer of tissue (e.g., the throat in FIG. 7). FIG. 7 therefore shows the carotid artery. The threshold value may be selected such that the low gray scale values of the skin have been removed and the high gray scale values of the skin retained. The carotid artery has been colored using several strokes and therefore segmented. The parameters for rendering have been supplemented by threshold values for upper/lower thresholds for the gray scale values in which cutting or color effect is to take place.

The present embodiments may be implemented in various forms of hardware, software, firmware, special purpose processors or a combination thereof. The present embodiments may be implemented on a graphics processing unit (GPU) with open graphics language (OpenGL) and the OpenGL shading language.

The present embodiments may be implemented in software as an application program. The application program may be loaded onto a computer that has any desired suitable architecture, and executed thereon.

Figure 8:
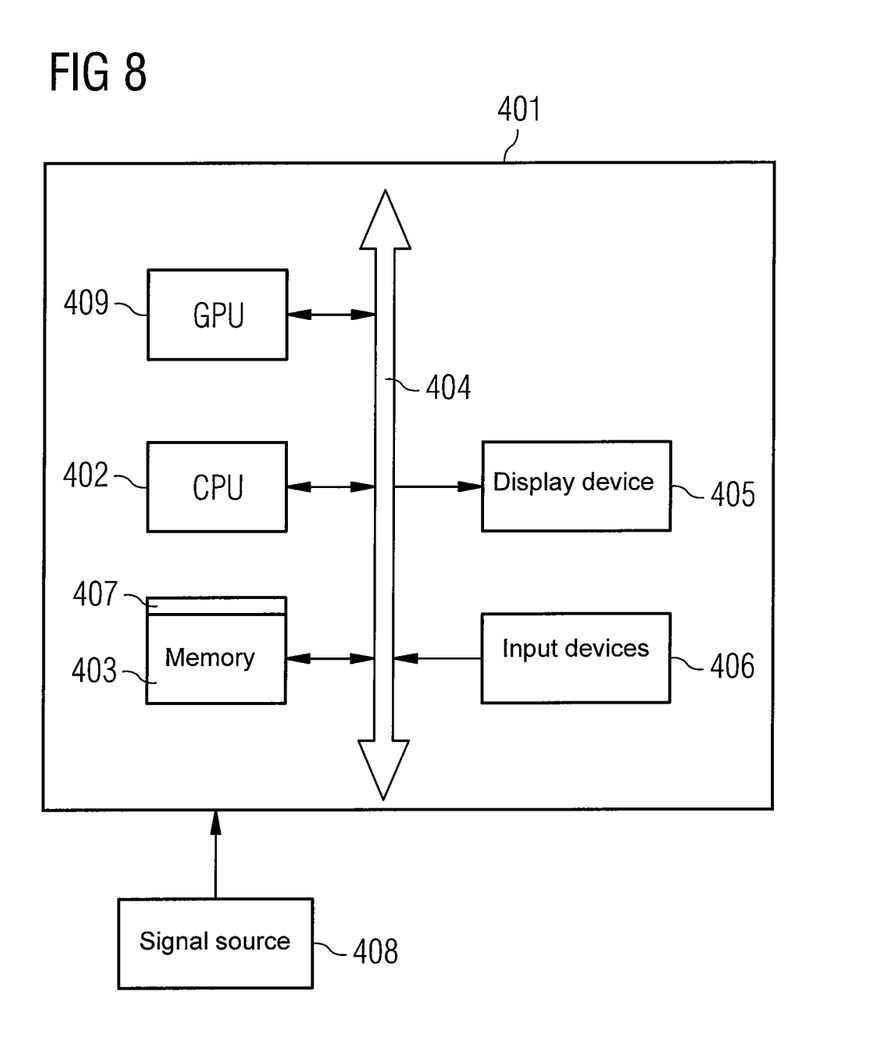
FIG. 8 shows a hardware structure for carrying out one embodiment of a method for influencing a depiction of a three-dimensional object.

In one embodiment, as shown in FIG. 8, a computer system 401 for GPU-based ray casting may include, among other things, a central processing unit (CPU) 402, a memory 403, and an input/output (I/A) interface 404. The computer system 401 may be coupled via the I/A interface 404 to a display device 405 and various input devices 106 such as a mouse or keyboard. Peripheral circuits may include circuits such as a cache, power supply, clock circuits and communications distributing wires. The memory 403 may include, for example, a random access memory (RAM), a read only memory (ROM), a disk drive, a tape drive, or a combination thereof. The present embodiments may be implemented as a program routine 407 that is stored in the memory 403 and executed by the CPU 402 in order to process the signal from the signal source 408. The computer system 401 also includes a graphic processing unit (GPU) 409 for processing graphic instructions (e.g., for processing the signal source 408, which includes image data). The computer system 401 is a general multi-purpose computer system that becomes a special purpose computer system if the computer system 401 executes the program 407 of the present embodiments.

The computer platform 401 also includes an operating system and a micro-command code. The various methods and functions described herein may either be part of the micro-command code or part of the application program (or a combination thereof), which is executed by the operating system. Various other peripherals, such as, for example, an additional data storage device and a printer, may also be connected to the computer platform.

As some of the individual system components and method acts, which are illustrated in the accompanying figures, may be implemented in software. The actual connections between the system components (or between the process acts) may differ as a function of the manner in which the present embodiments programmed.

The present embodiments are not restricted to the applications described herein. In particular, the methods of the present embodiments may be used in virtual depictions in fields quite different from medical engineering. Examples include the visualization of products in the context of business and trade and computer games.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for influencing a depiction of a three-dimensional object that is displayed using volume rendering, the method comprising:
    providing a representation of the object, in which values of a variable characterizing the object are given at spatial points of the object in a form of gray scale values obtained through imaging of the object, and in which color values are allocated to the variable during the course of the volume rendering;
    inputting a set of points defined in a space of the representation of the object;
    calculating a distance from the spatial points in the space of the representation of the object to the set of points, wherein a first segment that connects a first spatial point and the set of points is not restricted to being parallel to a second segment that connects a second spatial point and the set of points, wherein the calculated distance is either along the first segment or the second segment;
    inputting a threshold value for comparison with the calculated distance;

modifying the color values allocated to the spatial points according to the calculated distance from the set of points when the calculated distance is smaller than the threshold value; and calculating a depiction of the object by the volume rendering, using the representation of the object, wherein the representation comprises the modified color values.

2. The method as claimed in claim 1, wherein the set of points is defined by parameters.

3. The method as claimed in claim 2, wherein the parameters define a line segment.

4. The method as claimed in claim 2, wherein the inputting of the set of points takes place at a same time as the volume rendering is carried out, which takes account of the parameters that have already been input.

5. The method as claimed in claim 1, further comprising determining a color, a transparency, or the color and the transparency.

6. The method as claimed in claim 1, further comprising specifying a transfer function.

7. The method as claimed in claim 1, wherein the set of points is defined by an input, using which, points of a surface of the object defining the set of points are determined.

8. The method as claimed in claim 7, wherein segments are determined by the input.

9. The method as claimed in claim 7, wherein the input is made on a monitor with a two-dimensional depiction of the object using an input device.

10. The method as claimed in claim 9, wherein influencing of the two-dimensional depiction of the object is reversed or corrected by changing the input parameters.

11. The method as claimed in claim 7, further comprising:
removing a region of the object;
calculating surface gradients for a surface resulting from removal of the region; and
weighting gradients in a layer below the surface resulting from removal of the region with the calculated surface gradients.

12. The method as claimed in claim 1, wherein the volume rendering is carried out using ray casting, and
wherein a subset of rays used during the ray casting is determined, and
wherein the subset of rays, depending on the input parameters, do not require any re-calculation.

13. The method as claimed in claim 1, further comprising:
removing a region of the object;
calculating surface gradients for a surface resulting from removal of the region; and
weighting gradients in a layer below the surface resulting from removal of the region with the calculated surface gradients.

14. The method as claimed in claim 1, wherein the object is depicted with aid of a data record comprising a plurality of different data records, and
wherein the depiction of the object is changed by influencing the depiction for individual data records of the plurality of data records.

15. The method as claimed in claim 1, wherein the object comprises regions of different materials, and
wherein the method is linked with the threshold value to influence the depiction of at least part of a region comprising a certain material.

16. The method of claim 1, wherein the representation of the object is obtained through nuclear spin, computed tomography, ultrasound, or positron emission tomography.

17. A device for influencing a depiction of a three-dimensional object that is displayed using volume rendering, the device comprising:
a computer system configured to provide a representation of the object, in which values of a variable characterizing the object are given at spatial points of the object in a form of gray scale values obtained through imaging of the object, and in which color values are allocated to the variable during the course of the volume rendering; and
a user input configured for inputting a set of points defined in a space of the representation of the object,
wherein the computer system is further configured to:
calculate a distance from the spatial points in the space of the representation of the object to the set of points, wherein a first segment that connects a first spatial point and the set of points is not restricted to being parallel to a second segment that connects a second spatial point and the set of points, wherein the calculated distance is either along the first segment or the second segment;
input a threshold value for comparison with the calculated distance;
modify the color values allocated to the spatial points according to the calculated distance from the set of points when the calculated distance is smaller than the threshold value; and
calculate a depiction of the object by the volume rendering, using the representation of the object, wherein the representation comprises the modified color values.

18. A non-transitory computer readable storage medium storing a computer program product having a computer program executable by a processor for influencing a depiction of a three-dimensional object that is displayed using volume rendering, the computer program configured to:
provide a representation of the object, in which values of a variable characterizing the object are given at spatial points of the object in a form of gray scale values obtained through imaging of the object, and in which color values are allocated to the variable during the course of the volume rendering;
input a set of points defined in a space of the representation of the object;
calculate a distance from the spatial points in the space of the representation of the object to the set of points, wherein a first segment that connects a first spatial point and the set of points is not restricted to being parallel to a second segment that connects a second spatial point and the set of points, wherein the calculated distance is either along the first segment or the second segment;
input a threshold value for comparison with the calculated distance;
modify the color values allocated to the spatial points according to the calculated distance from the set of points when the calculated distance is smaller than the threshold value; and
calculate a depiction of the object by the volume rendering, using the representation of the object, wherein the representation comprises the modified color values.

19. The non-transitory computer readable storage medium of claim 18, wherein the set of points defined in the space of the representation of the object is defined by parameters that define a line segment.

* * * * *